(12) United States Patent
Li et al.

(10) Patent No.: US 12,021,242 B2
(45) Date of Patent: Jun. 25, 2024

(54) LITHIUM-ION BATTERY, POSITIVE ELECTRODE PLATE FOR LITHIUM-ION BATTERY, AND APPARATUS

(71) Applicant: CONTEMPORARY AMPEREX TECHNOLOGY CO., LIMITED, Ningde (CN)

(72) Inventors: Quanguo Li, Ningde (CN); Lile Liu, Ningde (CN); Xia Hu, Ningde (CN); Shaojun Niu, Ningde (CN); Yongbin Wu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/135,540

(22) Filed: Dec. 28, 2020

(65) Prior Publication Data
US 2021/0175511 A1 Jun. 10, 2021

Related U.S. Application Data

(63) Continuation of application No. PCT/CN2019/123338, filed on Dec. 5, 2019.

(51) Int. Cl.
*H01M 4/66* (2006.01)
*H01M 4/131* (2010.01)
(Continued)

(52) U.S. Cl.
CPC ........... *H01M 4/661* (2013.01); *H01M 4/131* (2013.01); *H01M 4/133* (2013.01); *H01M 4/134* (2013.01);
(Continued)

(58) Field of Classification Search
CPC .................................................. H01M 4/5825
See application file for complete search history.

(56) References Cited

U.S. PATENT DOCUMENTS

| 2010/0248038 A1* | 9/2010 | Takami | ............. | H01M 10/0525 429/223 |
| 2013/0134349 A1* | 5/2013 | Kagei | ................... | H01M 4/131 252/182.1 |

(Continued)

FOREIGN PATENT DOCUMENTS

| CN | 101246972 A | 8/2008 |
| CN | 102931378 A | 2/2013 |

(Continued)

OTHER PUBLICATIONS

Contemporary Amperex Technology Co., Limited, Written Opinion of the International Searching Authoriy, PCT/CN2019/123338, Jul. 29, 2020, 5 pgs.

(Continued)

*Primary Examiner* — Nathanael T Zemui
(74) *Attorney, Agent, or Firm* — XSENSUS LLP

(57) ABSTRACT

This application provides a lithium-ion battery, a positive electrode plate for a lithium-ion battery, and an apparatus. The lithium-ion battery includes a positive electrode plate that includes a positive current collector and a positive active material layer arranged on at least one surface of the positive current collector. A positive active material in the positive active material layer includes a positive active substance I and a positive active substance II. The positive active substance I is a layered lithium nickel transition metal oxide. The positive active substance II is an olivine-type li-containing phosphate. The positive electrode plate satisfies $2.5 \leq N/(PD \times (1-P_1) \times (1-A)) \leq 21$. The positive electrode plate for a lithium-ion battery has relatively high energy density, and a high transmission rate of lithium ions, which (Continued)

effectively increases instantaneous discharge power under a low SOC while ensuring high volume energy density of lithium-ion batteries using the positive electrode plate.

17 Claims, 3 Drawing Sheets

(51) Int. Cl.
| | | |
|---|---|---|
| *H01M 4/133* | (2010.01) | |
| *H01M 4/134* | (2010.01) | |
| *H01M 4/36* | (2006.01) | |
| *H01M 4/505* | (2010.01) | |
| *H01M 4/525* | (2010.01) | |
| *H01M 4/58* | (2010.01) | |
| *H01M 10/0525* | (2010.01) | |
| *H01M 4/02* | (2006.01) | |

(52) U.S. Cl.
CPC .......... *H01M 4/366* (2013.01); *H01M 4/505* (2013.01); *H01M 4/525* (2013.01); *H01M 4/58* (2013.01); *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

| | | | | |
|---|---|---|---|---|
| 2013/0280610 | A1* | 10/2013 | Hwang | H01M 4/5825 |
| | | | | 252/502 |
| 2015/0010819 | A1* | 1/2015 | Lee | H01M 4/505 |
| | | | | 429/223 |
| 2015/0349329 | A1* | 12/2015 | Saka | H01M 4/364 |
| | | | | 252/521.2 |
| 2017/0092945 | A1* | 3/2017 | Hiratsuka | H01M 4/525 |
| 2018/0277846 | A1* | 9/2018 | Oono | H01M 4/366 |
| 2019/0207202 | A1 | 7/2019 | Wang et al. | |
| 2020/0020971 | A1* | 1/2020 | Ioka | H01M 4/134 |
| 2021/0098776 | A1* | 4/2021 | Kageura | H01M 4/1391 |

FOREIGN PATENT DOCUMENTS

| | | |
|---|---|---|
| CN | 103413932 A | 11/2013 |
| CN | 103618084 A | 3/2014 |
| CN | 105098180 A | 11/2015 |
| CN | 106684330 A | 5/2017 |
| CN | 104466234 B | 10/2017 |
| CN | 107394124 A | 11/2017 |
| CN | 109638212 A | 4/2019 |
| JP | 2011228293 A | 11/2011 |
| JP | 2012-114048 A | 6/2012 |
| JP | 2017068958 A | 4/2017 |
| WO | WO2015059176 A1 | 4/2015 |
| WO | WO2016163282 A1 | 10/2016 |
| WO | WO-2018155314 A1 * | 8/2018 .......... H01M 4/131 |

OTHER PUBLICATIONS

Contemporary Amperex Technology Co., Limited, International Search Report PCT/CN2019/123338, Jul. 29, 2020, 5 pgs.—No Translation.
Contemporary Amperex Technology Co. Limited, Extended European Search Report, EP19932224.9, Aug. 11, 2021, 102 pgs.
Office Action issued on Nov. 15, 2022, in corresponding Chinese patent Application No. 201980098900.5, 12 pages.
Notification to Grant issued on May 15, 2023, in corresponding Chinese patent Application No. 201980098900.5, 5 pages.

* cited by examiner

LITHIUM-ION BATTERY, POSITIVE ELECTRODE PLATE FOR LITHIUM-ION BATTERY, AND APPARATUS

CROSS REFERENCE TO RELATED APPLICATIONS

This application is a continuation application of PCT Patent Application No. PCT/CN2019/123338, entitled "LITHIUM-ION BATTERY, POSITIVE ELECTRODE PLATE FOR LITHIUM-ION BATTERY, AND APPARATUS" filed on Dec. 5, 2019, which is incorporated herein by reference in its entirety.

TECHNICAL FIELD

This application relates to the field of batteries, and in particular, to a lithium-ion battery, a positive electrode plate for a lithium-ion battery, and an apparatus.

BACKGROUND

With countries' increasing attention paid to environmental protection, the new energy vehicle industry is also being strongly supported by the countries. The market share of new energy vehicles is increasing year by year, constantly replacing that of traditional fuel vehicles. Battery technology, as the first of the three major technologies for new energy vehicles, is constantly upgrading. The energy density of a battery is gradually increased, the capacity is gradually increased, and the cost is lower and lower. However, the acceleration performance, as one of the key factors for measuring the performance of a vehicle, requires very high charge-discharge power of the battery.

At present, the mass-produced batteries on the market are mainly lithium-ion phosphate system and ternary system batteries. These two types of batteries have one common point that under a high SOC (state of charge), the batteries have discharge power that is high enough to support instantaneous acceleration of vehicles, but under a low SOC, the instantaneous output power of the batteries cannot satisfy the instantaneous acceleration of vehicles at low power.

In view of the above problem that the power of a battery is too low under a low SOC, common improvement methods at present include: 1) reducing the weight of an active substance coated on a current collector of a cell to improve the maximum charge-discharge current of a battery, which has a disadvantage of reducing the proportion of the active substance in the whole cell weight, thereby reducing the mass energy density of the cell; 2) selecting an active substance with better dynamic performance, and increasing the content of conductive carbon to improve the maximum charge-discharge current, which has a disadvantage of increasing the cost of raw materials of the battery; and 3) selecting an electrolyte with high ionic conductivity to increase ionic conductivity so as to improve the maximum charge-discharge current, which has disadvantages that the cost is increased, and that the electrolyte is prone to decompose to cause excessive pressure inside the battery during charge-discharge cycles of the battery, which is likely to result in safety incidents.

SUMMARY

An objective of this application is to provide a lithium-ion battery to solve the current problem of low instantaneous discharge power of a lithium-ion battery under a low SOC, and provide a positive electrode plate for a lithium-ion battery, and an apparatus.

To achieve the foregoing objective, the following technical solutions are used in this application.

According to a first aspect of this application, a lithium-ion battery in provided, including a positive electrode plate. The positive electrode plate includes a positive current collector and a positive active material layer arranged on at least one surface of the positive current collector. A positive active material in the positive active material layer includes a positive active substance I and a positive active substance II. The positive active substance I is a layered lithium nickel transition metal oxide. The positive active substance II is an olivine-type li-containing phosphate.

The positive electrode plate satisfies $2.5 \leq N/(PD \times (1-P_1) \times (1-A)) \leq 21$, where A is a mass percentage of the positive active substance II in a total weight of the positive active material;

N is a number of particles of the positive active substance I accommodated in the positive active material layer in a thickness direction of the positive active material layer;

PD is a compacted density of the positive electrode plate, measured in $g/cm^3$; and $P_1$ is a porosity of the positive electrode plate.

According to a second aspect, this application provides a positive electrode plate for a lithium-ion battery. The positive electrode plate includes a positive current collector and the positive active material layer arranged on at least one surface of the positive current collector. A positive active material in the positive active material layer includes a positive active substance I and a positive active substance II. The positive active substance I is a layered lithium nickel transition metal oxide. The positive active substance II is an olivine-type li-containing phosphate.

The positive electrode plate satisfies $2.5 \leq N/(PD \times (1-P_1) \times (1-A)) \leq 21$, where A is a mass percentage of the positive active substance II in a total weight of the positive active material;

N is a number of particles of the positive active substance I accommodated in the positive active material layer in a thickness direction of the positive active material layer;

PD is a compacted density of the positive electrode plate, measured in $g/cm^3$; and $P_1$ is a porosity of the positive electrode plate.

According to a third aspect of this application, an apparatus is provided, including the lithium-ion battery according to the first aspect of this application. The lithium-ion battery serves as a power supply for the apparatus.

Compared with the prior art, this application can achieve at least the following beneficial effects:

In the lithium-ion battery provided by this application, a positive electrode plate includes a positive active material layer. The positive active material layer includes a positive active substance I and a positive active substance II. The positive active substance I is a layered lithium nickel transition metal oxide. The positive active substance II is an olivine-type li-containing phosphate. The positive electrode plate satisfies $2.5 \leq N/(PD \times (1-P_1) \times (1-A)) \leq 21$. When the positive electrode plate satisfies this relational expression, the lithium-ion battery can obtain relatively high discharge current and discharge power under a low SOC, and particularly, can satisfy an instantaneous acceleration demand of existing power vehicles for lithium-ion batteries under a low SOC.

In the lithium-ion battery provided by the this application, by properly setting the active substance particle size distributions and relative percent compositions of the layered lithium nickel transition metal oxide and the olivine-type li-containing phosphate in the positive active material, as well as the spacing between active substance particles in the positive electrode plate plane and the compacted density and the porosity of the overall positive electrode plate, the lithium ion transmission rate, energy density, charge-discharge power, and the like of the positive electrode plate are optimized, thereby increasing instantaneous discharge power of the lithium-ion battery under a low SOC while ensuring high volume energy density of the battery.

The apparatus of this application includes the lithium-ion battery as described in this application, and therefore has at least the same advantages as the lithium-ion battery.

BRIEF DESCRIPTION OF DRAWINGS

To describe the technical solutions in the embodiments of this application or in the prior art more clearly, the following briefly describes the accompanying drawings required for describing the specific embodiments or the prior art. Apparently, the accompanying drawings in the following description show merely some embodiments of this application, and a person of ordinary skill in the art may still derive other drawings from these accompanying drawings without creative efforts.

Figure 1:
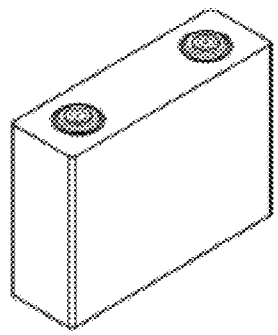
FIG. 1 is a perspective view of an embodiment of a lithium-ion battery.

REFERENCE SIGNS IN THE ACCOMPANYING DRAWINGS ARE DESCRIBED AS FOLLOWS 1. battery pack;
2. upper cabinet body;
3. lower cabinet body;
4. battery module;
5. battery;
51. housing;
52. electrode assembly; and
53. cover assembly.

DESCRIPTION OF EMBODIMENTS

The implementation solutions of this application will now be described in detail with reference to the embodiments. However, a person skilled in the art will understand that the following embodiments are merely intended to illustrate this application but not to limit the scope of this application. Embodiments, where specific conditions are not specified, are implemented in accordance with general conditions or those recommended by a manufacturer.

According to a first aspect, this application provides a lithium-ion battery, including a positive electrode plate. The positive electrode plate includes a positive current collector and a positive active material layer arranged on at least one surface of the positive current collector. A positive active material in the positive active material layer includes a positive active substance I and a positive active substance II.

The positive active substance I is a layered lithium nickel transition metal oxide. The positive active substance II is an olivine-type li-containing phosphate.

The positive electrode plate satisfies $2.5 \leq N/(PD \times (1-P_1) \times (1-A)) \leq 21$, where A is a mass percentage of the positive active substance II in a total weight of the positive active material;

N is the number of particles of the positive active substance I accommodated in the positive active material layer in a thickness direction of the positive active material layer;

PD is a compacted density of the positive electrode plate, measured in $g/cm^3$; and $P_1$ is a porosity of the positive electrode plate.

In the lithium-ion battery provided by this application, by properly setting the active substance particle size distributions and relative percent compositions of the layered lithium nickel transition metal oxide and the olivine-type li-containing phosphate in the positive active material, as well as the spacing between active substance particles in the positive electrode plate plane, and the compacted density and the porosity of the overall positive electrode plate, the lithium ion transmission rate, energy density, charge-discharge power, and the like of the positive electrode plate are optimized, thereby achieving the objective of increasing instantaneous discharge power of the battery under a low SOC.

In the lithium-ion battery provided by this application, characteristics of output power of the positive electrode plate plane under a low SOC are closely related to the spacing between active substance particles, and the compacted density and the porosity of the positive electrode plate, as well as the respective types, particle morphologies and particle size distributions of the positive active substance I and the positive active substance II, and an overall particle size distribution condition after the positive active substance I and the positive active substance II are mixed.

In some preferred implementations of this application, when the positive active substance I in this application is of a single particle morphology, $6 \leq N/(PD \times (1-P_1) \times (1-A)) \leq 21$, more specifically, $8 \leq N/(PD \times (1-P_1) \times (1-A)) \leq 19$.

In some preferred implementations of this application, when the positive active substance I in this application is of a secondary particle morphology, $2.5 \leq N/(PD \times (1-P_1) \times (1-A)) \leq 9$, more specifically, $3 \leq N/(PD \times (1-P_1) \times (1-A)) \leq 8$.

Further, the number N of particles of the positive active substance I accommodated in the positive active material layer in the thickness direction of the positive active material layer is 6 to 55, more specifically, 7 to 40. More specifically, when the positive active substance I is single particles, N is 20 to 40; and when the positive active substance I is secondary particles, N is 6 to 20. In this application, by optimizing the value of N of the particles of the positive active substance I, the porosity of the overall positive electrode plate can be adjusted and the transmission of lithium ions in the positive active substance I can be ensured, thereby maintaining relatively good charge-discharge power of the positive electrode plate.

Specifically, the value range of N may include without limitation, for example, 7, 10, 12, 15, 17, 20, 23, 25, 28, 30, 32, 35, 38, 40, 42, 45, 48, 50, 53, and 55.

In this application, N is the number of particles of the positive active substance I accommodated in the positive active material layer in the thickness direction of the positive active material layer.

As an illustrative description, when N is calculated, cross sections are made in the thickness direction of the positive electrode plate at any 10 positions of the positive electrode plate, the numbers of arranged particles of the positive active substance I are respectively calculated in the thickness direction which are denoted as $N_1$, $N_2$, $N_3$, . . . , $N_9$, and $N_{10}$, and an average value is calculated and denoted as N, which is an average number of particles of the positive active substance I accommodated in the positive active material layer. The value of N is thus calculated.

When N is tested, a section scanning electron microscope with a magnification of 1000 to 5000 is used for observing. When the positive active substance I is of a single particle morphology, because the material particles are relatively small, the magnification of 5000 is used preferably for magnifying and measuring. When the positive active substance I is of a secondary particle morphology, because the material particles are relatively large, the magnification of 1000 is used preferably for magnifying and measuring.

Further, the mass percentage A of the positive active substance II in the total weight of the positive active material satisfies 2%≤A≤40%, more specifically, 10%≤A≤20%. In the positive active material of this application, the mass percentage A of the positive active substance II is within the above range, the corresponding charge-discharge power performance of the lithium-ion battery under a low SOC is relatively good, and the volume energy density of a battery cell is relatively high.

Further, the porosity P1 of the positive electrode plate satisfies 19%≤$P_1$≤25%, more specifically, 20%≤$P_1$≤25%. In this application, the porosity of the positive electrode plate may be tested by using a porosity tester. The porosity of the positive electrode plate being controlled within the above range can not only ensure a relatively high composition of active substances that can be loaded in the positive electrode plate, which is beneficial to improving the volume energy density of the battery, but also ensure quick entrance of lithium ions into the plate, facilitating relatively good charge-discharge power of the lithium-ion battery using the positive electrode plate.

Further, the compacted density PD of the positive electrode plate satisfies 3.1 g/cm$^3$≤PD≤3.5 g/cm$^3$, more specifically, 3.2 g/cm$^3$≤PD≤3.5 g/cm. In this application, when the compacted density PD of the positive electrode plate is within the above range, thickness of the positive electrode plate formed after cold pressing is moderate, under the same capacity, the energy density is relatively large, and the charge-discharge power is relatively high; in addition, PD being within the numerical range can ensure that the positive electrode plate has relatively good machining performance.

In this application, PD is the compacted density of the positive electrode plate. PD can be tested using this test method: taking a circular positive electrode plate with an area of 1540.25 mm$^2$ as a basic unit, the total weight of the positive electrode plate with the positive active material coated on both sides being M, a weight of the positive current collector being B, thickness of the positive current collector being T, and thickness of a copper/aluminum foil being p, and then PD=(M−B)/(T−μ)/1540.25*1000.

Further, the average particle size of the particles of the positive active substance I is 0.1 μm to 25 μm, more specifically, 3 μm to 16 μm. More specifically, when the positive active substance I is single particles, the average particle size of the positive active substance I is preferably 3 μm to 7 μm. When the positive active substance I is secondary particles, the average particle size of the positive active substance I is preferably 6 μm to 16 μm.

Further, the average particle size of the particles of the positive active substance II is 0.01 μm to 15 μm, more specifically, 2.5 μm to 7 μm.

Further, more specifically, a particle size distribution $(D_{max}-D_{min})_I$ of the positive active substance I is smaller than a particle size distribution $(D_{max}-D_{min})_{II}$ of the positive active substance II. More specifically, the positive active substance I is single particles, the positive active substance II includes micropowder particles of 100 nm to 1000 nm and secondary particles with the particle size of 8 μm to 16 μm. By using a mixture of the positive active substance I and the positive active substance II with above particle size distribution characteristics as the positive active material, the positive electrode plate is implemented with a high compacted density to exploit the advantage of high energy density of the positive active substance I, and the performance of the positive active substance II in improving the charge-discharge power of the battery under a low voltage is also brought to play.

In this application, the positive active substance I is a layered lithium nickel transition metal oxide. The layered lithium nickel transition metal oxide is selected from one or more of $Li_{x1}Ni_{(1-y1-z1-a1)}Co_{y1}Mn_{z1}M1_{a1}O_2$, $Li_{x2}Ni_{(1-y2-z2-a2)}Co_{y2}Al_{z2}M2_{a2}O_2$, and a composite material obtained by coating and modifying, where 0.90≤x1≤1.05, 0<y1≤0.2, 0<z1≤0.2, 0≤a1≤0.05, and M1 is selected from one or more of Ti, Al, Zr, Mg, Zn, Ba, Mo, and B; and 0.90≤x2≤1.05, 0<y2≤0.1, 0<z2≤0.1, 0≤a2≤0.05, and M2 is selected from one or more of Ti, Mn, Zr, Mg, Zn, Ba, Mo, and B.

Further, more specifically, 0<y1+z1+a1≤0.4, and 0<y2+z2+a2≤0.4.

Specifically, the layered lithium nickel transition metal oxide in this application includes but is not limited to $LiNi_{0.5}Co_{0.2}Mn_{0.3}O_2$, $LiNi_{0.5}Co_{0.25}Mn_{0.25}O_2$, $LiNi_{0.55}Co_{0.15}Mn_{0.3}O_2$, $LiNi_{0.55}Co_{0.1}Mn_{0.35}O_2$, $LiNi_{0.55}Co_{0.05}Mn_{0.4}O_2$, $LiNi_{0.6}Ca_{0.2}Mn_{0.2}O_2$, $LiNi_{0.65}Co_{0.15}Mn_{0.2}O_2$, $LiNi_{0.65}Co_{0.12}Mn_{0.23}O_2$, $LiNi_{0.65}Co_{0.1}Mn_{0.25}O_2$, $LiNi_{0.65}Co_{0.05}Mn_{0.3}O_2$, $LiNi_{0.7}Co_{0.1}Mn_{0.2}O_2$, $LiNi_{0.75}Co_{0.1}Mn_{0.15}O_2$, $LiNi_{0.8}Co_{0.1}Mn_{0.1}O_2$, $LiNi_{0.85}Co_{0.05}Mn_{0.1}O_2$, $LiNi_{0.88}Co_{0.05}Mn_{0.07}O_2$, $LiNi_{0.9}Co_{0.05}Mn_{0.05}O_2$, $LiNi_{0.92}Co_{0.03}Mn_{0.05}O_2$, $LiNi_{0.95}Co_{0.02}Mn_{0.03}O_2$, and the like, or may be a substance obtained through partial substitution and modification of the above substances with a doping element M1 or M2, where M1 is selected from one or more of Ti, Al, Zr, Mg, Zn, Ba, Mo and B, and M2 is selected from one or more of Ti, Mn, Zr, Mg, Zn, Ba, Mo and B.

In the positive electrode plate of the lithium-ion battery in the first aspect of this application, a general formula of the olivine-type li-containing phosphate is $LiFe_{1-x3-y3}Mn_{x3}M'_{y3}PO_4$, where 0≤x3<1, y3<01, and M' is selected from one or more of transition metal elements other than Fe and Mn and non-transition metal elements.

Preferably, the olivine-type li-containing phosphate is selected from one or more of $LiFePO_4$, $LiMnPO_4$, and $LiMn_{1-x3}Fe_{x3}PO_4$, where 0<x3<1.

It can be known from tests that the instantaneous output power of the lithium-ion battery of this application is not less than 2 W/Wh under 20% SOC.

The positive electrode plate, negative electrode plate, separator and electrolyte of the lithium-ion battery of this application will be described illustratively below.

A person skilled in the art may select an appropriate method to prepare the positive electrode plate. For example, a preparation method for the positive electrode plate may include the following steps: mixing the positive active substance I, the positive active substance II, a binder, and a conductive agent to form a slurry, and then coating the positive electrode collector with the slurry.

In the positive electrode plate, the positive active material layer may further include a conductive agent and a binder. The conductive agent and the binder are not limited to any specific types or content amounts, which may be selected according to actual needs. The binder typically includes fluorine-containing polyolefin binders. With respect to the fluorine-containing polyolefin binders, water is usually a good solvent. In other words, the fluorine-containing polyolefin binders usually exhibit good solubility in water. For example, the fluorine-containing polyolefin binders may include but not be limited to polyvinylidene fluoride (PVDF), vinylidene fluoride copolymer or their modified (for example, modified by carboxylic acid, acrylic acid, or acrylonitrile) derivatives. In the positive material layer, for the mass percentage of the binder, the used amount of the binder may not be too high because of the poor conductivity of the binder. Preferably, the mass percentage of the binder in the positive active substance layer is less than or equal to 2 wt % so as to obtain relatively low impedance of the electrode plate. The conductive agent of the positive electrode plate may be various conductive agents suitable for lithium-ion batteries in the field, and for example, may include but not be limited to one of a combination of one or more of acetylene black, conductive carbon black, vapor grown carbon fiber (VGCF), carbon nanotubes (CNT), Ketjen black, and the like. The weight of the conductive agent may be 1 wt % to 10 wt % of a total mass of the positive material layer. More specifically, a weight ratio of the conductive agent to the positive active material in the positive electrode plate is greater than or equal to 1.5:95.5. The positive current collector is also not limited to any specific type, which may be selected according to actual needs. In this application, the positive current collector may typically be a layered body. The positive current collector may typically be a structure or a part that can collect current. The positive current collector may be made of various materials suitable for serving as a positive current collector for lithium-ion batteries in the field. For example, the positive current collector may include but not be limited to a metal foil, and more specifically, may include but not be limited to a nickel foil and an aluminum foil.

In the lithium-ion battery of this application, the negative electrode plate typically includes a negative current collector and a negative active material layer located on a surface of the negative current collector. The negative active material layer includes a negative active material. The negative active material is selected from any one of soft carbon, hard carbon, artificial graphite, natural graphite, silicon, silicon oxide compound, a silicon carbon composite, lithium titanate, or a metal that can form an alloy with lithium.

Further, a porosity of the positive electrode plate satisfies 19%≤$P_2$≤25%, more specifically, 20%≤$P_2$≤24%.

In the lithium-ion battery of this application, the separator may be of various materials suitable for lithium-ion batteries in the field, and for example, may include but not be limited to one of a combination of one or more of polyethylene, polypropylene, polyvinylidene fluoride, kevlar, polyethylene terephthalate, polytetrafluoroethylene, polyacrylonitrile, polyimide, polyamide, polyester, and natural fibers.

Figure 2:
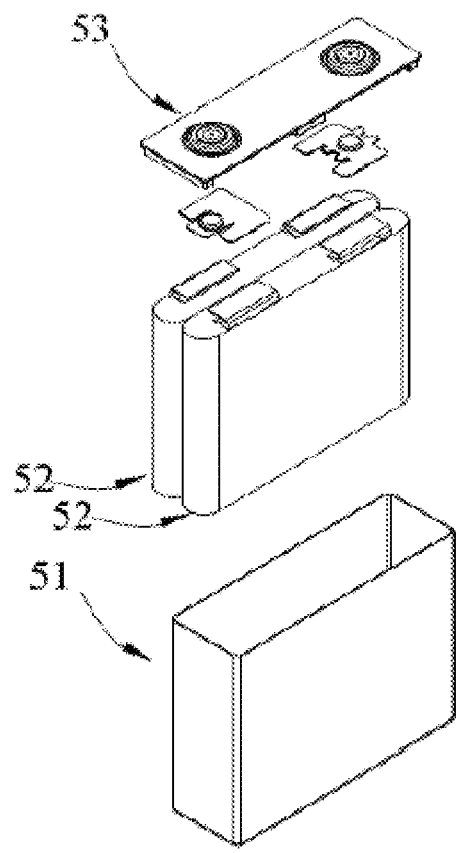
FIG. 2 is an exploded view of an embodiment of a lithium-ion battery.

This application does not impose special limitations on a shape of the lithium-ion battery, and the lithium-ion battery may be of a cylindrical shape, a square shape, or any other shapes. FIG. 1 and FIG. 2 show a lithium-ion battery 5 of a square structure as an example.

In some embodiments, lithium-ion batteries may be assembled into a battery module, and a battery module may include a plurality of lithium-ion batteries. The specific quantity may be adjusted according to the use case and capacity of the battery module.

Figure 3:
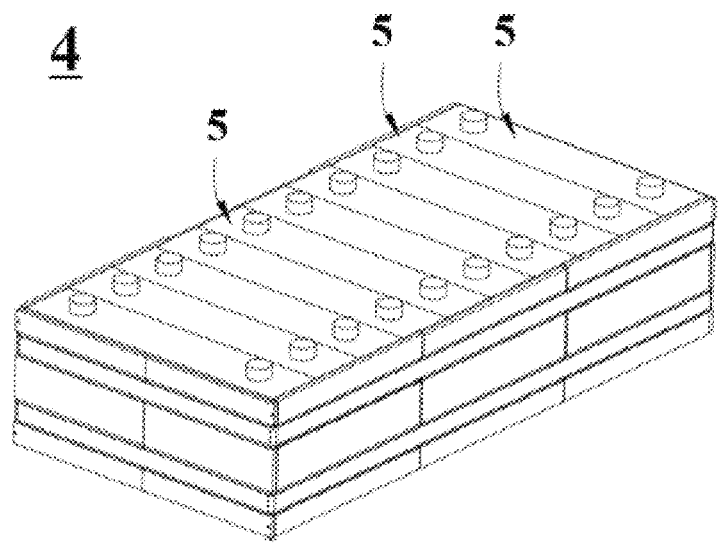
FIG. 3 is a perspective view of an embodiment of a battery module.

FIG. 3 shows a battery module 4 as an example. Referring to FIG. 3, in the battery module 4, a plurality of lithium-ion batteries 5 may be sequentially arranged in a length direction of the battery module 4. Certainly, they may be arranged in any other manners. Further, the plurality of lithium-ion batteries 5 may be fixed by using fasteners.

Optionally, the battery module 4 may further include a housing with an accommodating space, and the plurality of lithium-ion batteries 5 are accommodated in the accommodating space.

In some embodiments, battery modules may be further assembled into a battery pack, and the quantity of the battery modules included in the battery pack may be adjusted according to the use case and capacity of the battery pack.

Figure 4:
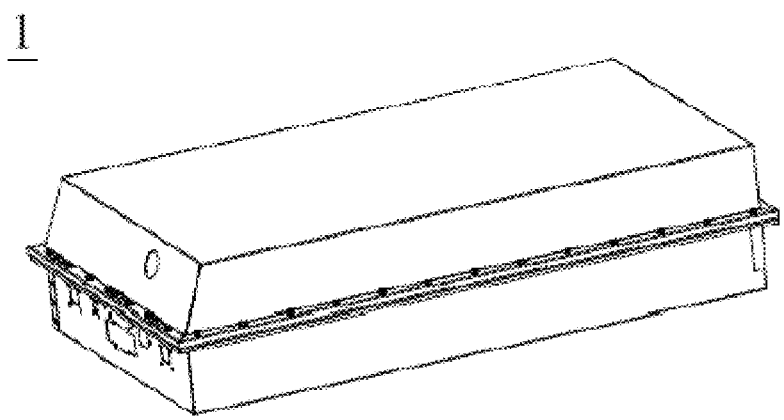
FIG. 4 is a perspective view of an embodiment of a battery pack.
Figure 5:
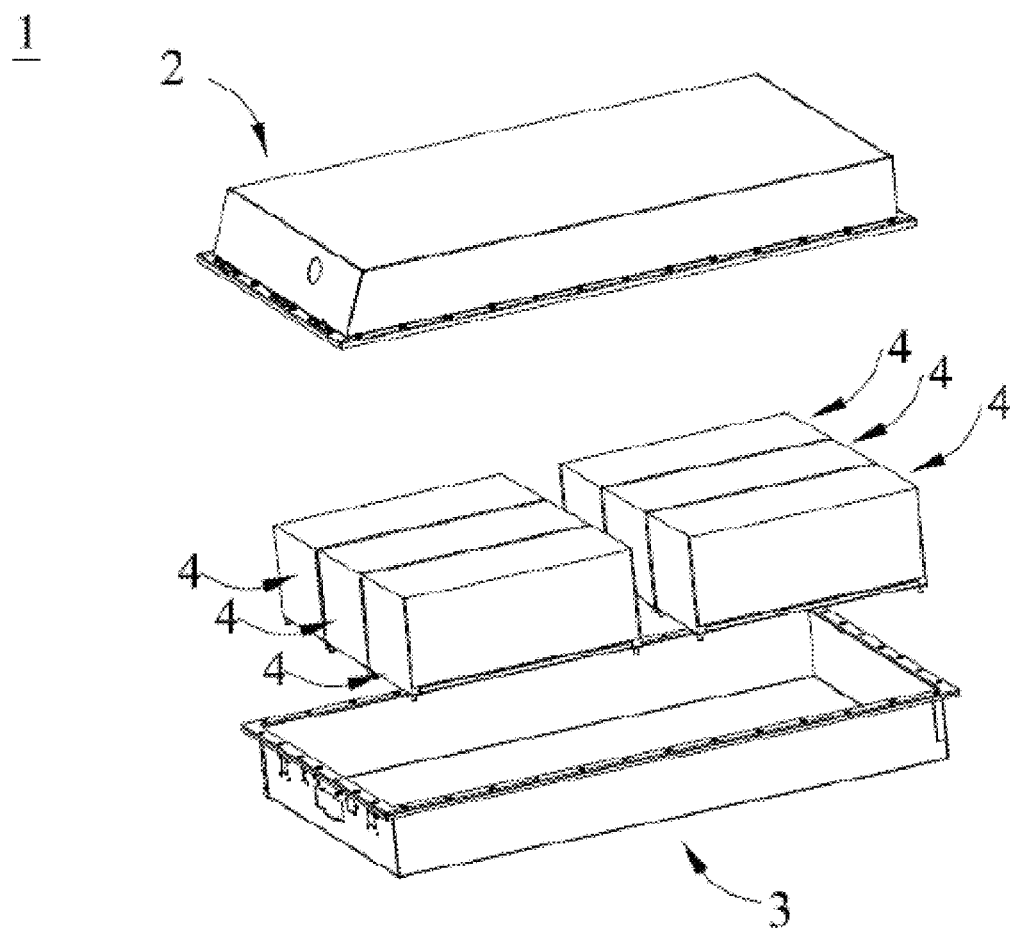
FIG. 5 is an exploded view of FIG. 4.

FIG. 4 and FIG. 5 show a battery pack 1 as an example. Referring to FIG. 4 and FIG. 5, the battery pack 1 may include a battery cabinet and a plurality of battery modules 4 arranged in the battery cabinet. The battery cabinet includes an upper cabinet body 2 and a lower cabinet body 3. The upper cabinet body 2 may cover the lower cabinet body 3 to form an enclosed space for accommodating the battery modules 4. The plurality of battery modules 4 may be arranged in the battery cabinet in any manner.

According to a second aspect, this application provides a positive electrode plate for a lithium-ion battery. The positive electrode plate includes a positive active material layer. A positive active material in the positive active material layer includes a positive active substance I and a positive active substance II. The positive active substance I is a layered lithium nickel transition metal oxide. The positive active substance II is an olivine-type li-containing phosphate.

The positive electrode plate satisfies 2.5≤N/(PD×(1−$P_1$)×(1−A))≤21, where

A is a mass percentage of the positive active substance II in a total weight of the positive active material;

N is the number of particles of the positive active substance I in a thickness direction of the positive electrode plate at an intersection of a length central line of the electrode main body and a height central line of the electrode main body;

PD is a compacted density of the positive electrode plate, measured in g/cm³; and $P_1$ is a porosity of the positive electrode plate.

Further, in this application, when the positive active substance I is of a single particle morphology, 6≤N/(PD×(1−$P_1$)×(1−A))≤21, more specifically, 8≤N/(PD×(1−$P_1$)×(1−A))≤19.

Further, in this application, when the positive active substance I is of a secondary particle morphology, 2.5≤N/(PD×(1−$P_1$)×(1−A))≤9, more specifically, 3≤N/(PD×(1−$P_1$)×(1−A))≤8.

In this application, when the positive electrode plate satisfies the relational expression above, the lithium-ion battery can obtain relatively large discharge current and discharge power under a low SOC, which can satisfy instantaneous acceleration of existing vehicles under a low SOC. In the positive electrode plate provided by this application, by properly setting the particle sizes and relative percent compositions of the positive active substance I and positive active substance II, as well as the number of particles of the positive active substance I in the central position of the electrode plate, and the compacted density and the porosity of the electrode plate, the instantaneous discharge power of the battery under a low SOC is increased, thereby achieving good power performance.

In this application, the number N of particles of the positive active substance I accommodated in the positive active material layer in the thickness direction of the positive active material layer is 6 to 55. Preferably, N is 6 to 40; more specifically, when the positive active substance I is single particles, N is 20 to 40; and when the positive active substance I is secondary particles, N is 6 to 20. In this application, by optimizing the value of N of the particles of the positive active substance I, the porosity of the overall positive electrode plate can be adjusted and the transmission of lithium ions in the positive active substance I can be ensured, thereby maintaining relatively good charge-discharge power of the positive electrode plate.

Specifically, the positive electrode plate provided in the second aspect of this application is the positive electrode plate used in the lithium-ion battery in the first aspect of this application. Therefore, various component parameters of the positive electrode plate provided in the second aspect are the same as those of the positive electrode plate of the lithium-ion battery in the first aspect, which are not described in detail herein again.

According to a third aspect, this application provides an apparatus. The apparatus includes the lithium-ion battery described in the first aspect of this application. The lithium-ion battery serves as a power supply for the apparatus.

Figure 6:
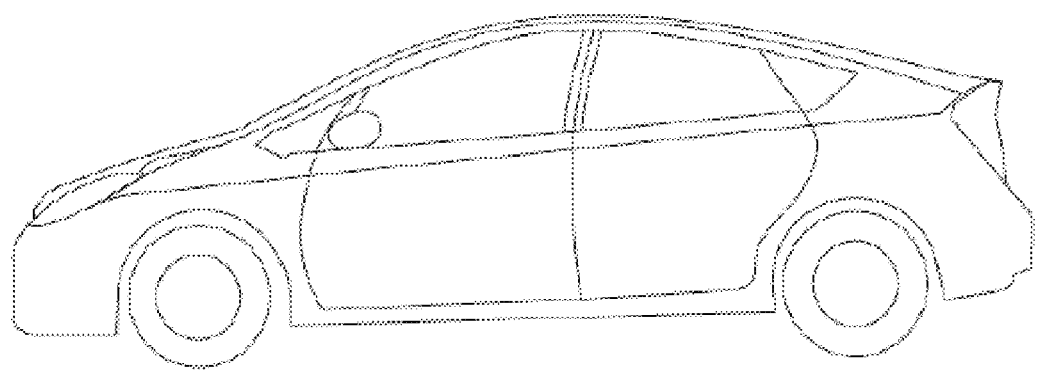
FIG. 6 is a schematic view of an embodiment of an apparatus using a lithium-ion battery as a power supply.

In FIG. 6, the apparatus that uses batteries 5 is an electric car. However, the apparatus that uses batteries 5 is limited thereto. Rather, it may be any electric vehicles other than electric cars (for example, an electric bus, a tramcar, an electric bicycle, an electric motorbike, an electric scooter, an electric golf cart, and an electric truck), electric ships, electric tools, electronic devices, and energy storage systems. The electric car may be a full electric car, a hybrid electric car, or a plug-in hybrid electric car. Of course, depending on the actual form of use, the apparatus provided in the third aspect of this application may include the battery module 4 described in the first aspect of this application; or, of course, the apparatus provided by the third aspect of this application may include the battery pack 1 described in the first aspect of this application.

This application will be further described in detail below with reference to Examples and Comparative Examples.

Example 1

The example was a lithium-ion battery, and its specific preparation process was as follows:

1) Preparation of a positive electrode plate: a positive active substance I-1 (NCM523), a positive active substance II-1 (LiFePO4), acetylene black used as a conductive agent, polyvinylidene fluoride (PVDF) used as a binder (specific parameters of the positive active substance I-1 and II-2 were shown in Table 1 and Table 2) were separately added into a 200 L mixing tank according to the weight percentage ratio of 92.3%:3%:2.3%:1.1%. The materials were stirred for 15 minutes at a dispersing speed of 800 rpm, and were dispersed and stirred for 220 minutes in an N-methylpyrrolidone solvent system at a speed of 1200 rpm. Finally, a slurry viscosity was regulated to be 8900 mPa·s. The fully stirred and uniformly mixed slurry was applied to an Al foil with a thickness of 13 μm, followed by drying and cold pressing, and finally, a positive electrode plate was obtained.

The percentage of LiFePO$_4$ in the positive active material is denoted as A.

2) A PE porous polymer film was used as a separator.

3) Preparation of a negative electrode plate. negative electrode graphite powder, a dispersant, a conductive agent and a binder were added into a 200 L mixing tank according to the weight percentage ratio of 96.2%:1.2%:0.8%:1.8%, and were dry-blended and stirred for 15 minutes at a dispersing speed of 800 rpm; then, an appropriate amount of deionized water was added: the resulting mixture was dispersed and stirred for 60 minutes at a speed of 1000 rpm; and finally, the slurry viscosity was regulated to be 10000 mPa·s. The fully stirred and uniformly mixed slurry was applied to a copper foil with a thickness of 6 μm, followed by drying and cold pressing, and finally, a negative electrode plate was obtained. The porosity of the negative electrode plate was 20%.

4) The positive electrode plate, the separator, and the negative electrode plate were laminated in turn, and the separator was located between the positive electrode plate and the negative electrode plate to achieve an effect of separation; the laminated product was wound into a bare cell; the bare cell was placed in an outer package; and a prepared basic electrolyte was injected, followed by packaging to obtain a lithium-ion battery.

Examples 2-15

Each of the Examples 2-15 was a lithium-ion battery. Differences between Examples 2-15 and Example 1 were listed in Table 3. Specific compositional raw materials of the positive active substances of various Examples were as shown in Table 1 and Table 2. Parts absent from Table 3 are the same as those of Example 1. Here, N/(PD×(1−P$_1$)×(1−A)) is denoted as α.

Comparative Examples 1-3

Each of Comparative Examples 1-3 was a lithium-ion battery. Differences between Comparative Examples 1-3 and Example 1 were listed in Table 3. Specific compositional raw materials of the positive active substances of various Comparative Examples were as shown in Table 1 and Table 2. Parts absent from Table 3 are the same as those of Example 1. The positive active substance II (LiFePO$_4$) was not added in Comparative Example 3.

TABLE 1

| Positive active substance I | Component | Particle morphology | $D_{50}$ μm | $(D_{max}-D_{min})_I$ μm |
|---|---|---|---|---|
| I-1 | NCM523 | Single particles | 4.5 | 11 |
| I-2 | NCM523 | Single particles | 3.0 | 10 |
| I-3 | NCM523 | Single particles | 4.1 | 11 |
| I-4 | NCM523 | Single particles | 6.2 | 15 |
| I-5 | NCM622 | Single particles | 4.3 | 10 |
| I-6 | NCM811 | Single particles | 3.9 | 9 |
| I-7 | NCM811 | Secondary particles | 16.0 | 30 |
| I-8 | NCM811 | Secondary particles | 12.0 | 27 |
| I-9 | NCM811 | Secondary particles | 8.0 | 17 |
| I-10 | NCM811 | Secondary particles | 6.0 | 15 |

TABLE 1-continued

| Positive active substance I | Component | Particle morphology | $D_{50}$ μm | $(D_{max}-D_{min})_I$ μm |
|---|---|---|---|---|
| I-11 | NCM523 | Single particles | 1.9 | 8 |
| I-12 | NCM523 | Secondary particles | 12 | 26 |

Note:
NCM532 was Li[Ni$_{0.5}$Co$_{0.2}$Mn$_{0.3}$]O$_2$, NCM811 was Li[Ni$_{0.8}$Co$_{0.1}$Mn$_{0.1}$]O$_2$, and NCM622 was Li[Ni$_{0.6}$Co$_{0.2}$Mn$_{0.2}$]O$_2$.

TABLE 2

| Positive active substance II | Component | Particle morphology | $D_{50}$ μm | $(D_{max}-D_{min})_{II}$ μm |
|---|---|---|---|---|
| II-1 | LiFePO$_4$ | Secondary particles and a small amount of micropowder with a particle size of less than 500 nm | 6.9 | 14 |
| II-2 | LiFeVPO$_4$ | Secondary particles | 5.3 | 13 |
| II-3 | LiMn$_{0.2}$Fe$_{0.8}$PO$_4$ | Secondary particles | 4.1 | 12 |
| II-4 | LiFePO$_4$ | Secondary particles and a small amount of micropowder with a particle size of less than 100 nm | 2.6 | 8 |
| II-5 | LiFePO$_4$ | Secondary particles | 5.0 | 18 | magnification of 1000 to 5000 was used for observing cross sections in the thickness direction of the positive electrode plate. When a ternary active material was Li[Ni$_{0.5}$Co$_{0.2}$Mn$_{0.3}$]O$_2$, because the material particles were relatively small, the magnification of 5000 was used for magnifying and measuring; and when the ternary active material was Li[Ni$_{0.8}$Co$_{0.1}$Mn$_{0.1}$]O$_2$, because the material particles were relatively large, the magnification of 1000 was used preferably for magnifying and measuring.

In the test method, the cross sections were made in the thickness direction of the positive electrode plate at any 10 positions of the positive electrode plate, the numbers of arranged particles of the positive active substance I were respectively calculated along the thickness direction which were denoted as N1, N2, N3, . . . , N9, and N10. Then, an average value was calculated, denoted as N, which was an average number of particles of the positive active substance I accommodated in the positive active material layer in the thickness direction. The value of N was thus obtained.

2. Test Method for Compacted Density PD

A circular positive electrode plate with an area of 1540.25 mm$^2$ was taken as a basic unit, where a total weight of the positive electrode plate with the positive active material coated on both sides was M, a weight of the positive current collector was B, thickness of the positive current collector was T, and thickness of a copper/aluminum foil was μ, and then PD=(M−B)/(T−μ)/1540.25*1000.

3. Method for Testing Porosity

An electrode plate was die-cut into a small round piece with a diameter of less than or equal to 16 mm, and the thickness of the small round piece was recorded; and then a porosity tester was used for testing to obtain the porosity of the electrode plate.

TABLE 3

| No. | Positive active substance I | Positive active substance II | Mass percentage A of positive active substance II | N | PD g/cm$^3$ | $P_1$ | α |
|---|---|---|---|---|---|---|---|
| Example 1 | I-1 | II-1 | 3% | 55 | 3.4 | 20.6% | 21.0 |
| Example 2 | I-1 | II-1 | 8% | 50 | 3.4 | 21.7% | 20.4 |
| Example 3 | I-2 | II-1 | 10% | 40 | 3.2 | 25.0% | 18.5 |
| Example 4 | I-1 | II-1 | 10% | 30 | 3.4 | 22.9% | 12.7 |
| Example 5 | I-3 | II-1 | 10% | 25 | 3.5 | 19.0% | 9.8 |
| Example 6 | I-4 | II-1 | 15% | 20 | 3.4 | 23.7% | 9.1 |
| Example 7 | I-1 | II-1 | 20% | 17 | 3.4 | 22.3% | 8 |
| Example 8 | I-1 | II-1 | 30% | 13 | 3.4 | 23.1% | 7.1 |
| Example 9 | I-1 | II-1 | 40% | 10 | 3.4 | 23.4% | 6.4 |
| Example 10 | I-5 | II-1 | 10% | 33 | 3.4 | 22.7% | 14 |
| Example 11 | I-6 | II-1 | 10% | 35 | 3.4 | 22.7% | 14.8 |
| Example 12 | I-7 | II-1 | 10% | 6 | 3.4 | 25.0% | 2.6 |
| Example 13 | I-8 | II-2 | 10% | 12 | 3.4 | 23.7% | 5.1 |
| Example 14 | I-9 | II-3 | 10% | 17 | 3.4 | 22.6% | 7.2 |
| Example 15 | I-10 | II-4 | 10% | 20 | 3.4 | 20.0% | 8.2 |
| Comparative Example 1 | I-11 | II-1 | 5% | 60 | 3.4 | 20.9% | 23.5 |
| Comparative Example 2 | I-12 | II-5 | 30% | 5 | 3.6 | 16.9% | 2.4 |
| Comparative Example 3 | I-1 | / | / | 58 | 3.4 | 18.9% | / |

Determination of Parameters of the Positive Electrode Plate

1. Measurement Method for the Number N of Particles of the Positive Active Substance I Accommodated in the Positive Active Material Layer in the Thickness Direction of the Positive Active Material Layer When the number N of the positive active substance I was measured, a section scanning electron microscope with a Lithium-Ion Battery Performance Tests 1. Battery Capacity Test:

(1) Nominal capacity of a cell was defined as C (Ah), and a voltage range of the battery was an upper-limit voltage ($U_{max}$) and a lower-limit voltage ($U_{min}$) of a battery design.

(2) The positive electrode and negative electrode of the battery were connected with the positive electrode and negative electrode of a charge-discharge machine, and the battery was placed in a 25° C. thermostat for standing for 2 hours.

(3) The battery was discharged to the lower-limit voltage $U_{mix}$ at ⅓ C constant current, followed by standing for 1 hour, and then charged to the upper-limit voltage $U_{max}$ of the battery at ⅓ C constant current and constant voltage, followed by standing for 1 hour.

(4) The battery was discharged at ⅓ C current so that the voltage of the battery was discharged from $U_{max}$ to $U_{mix}$, and the capacity released during the process was termed battery capacity C0.

2. Energy Density Test:

(1) Energy of the battery released when the battery was discharged from a full charge state to the lower-limit voltage was tested according to the capacity test method.

(2) The fully released energy of the battery was divided by an actual weight of the battery to obtain a battery energy density.

3. Discharge power under 5% SOC (1) Actual capacity C0 of the battery was tested according to the capacity test method.

(2) After the battery was charged full, 95% of the energy in the battery was released at ⅓ C0 current, at which time, the battery state was 95% SOC. Attempts were made to discharge the cell according to ascending order of discharge current until discharge in 10 s reaches exactly the lower-limit voltage of the battery, and the discharge power measured at this time was the discharge power of the battery under 5% SOC.

The capacity, the energy intensity and the discharge power under 5% SOC of the lithium-ion batteries of Examples 1-15 and Comparative Examples 1-3 were respectively tested by the methods above. Test results are listed in Table 4.

TABLE 4

| No. | Capacity/Ah | Energy density mAh/g | Discharge power under 5% SOC Wh |
|---|---|---|---|
| Example 1 | 65.9 | 179.7 | 857.8 |
| Example 2 | 65.3 | 179.5 | 887.9 |
| Example 3 | 65.5 | 179.4 | 895.9 |
| Example 4 | 65.7 | 179.3 | 895.2 |
| Example 5 | 65.2 | 179.3 | 895.5 |
| Example 6 | 63.7 | 179 | 910.3 |
| Example 7 | 62.3 | 178.4 | 939.8 |
| Example 8 | 60.2 | 177.8 | 940.3 |
| Example 9 | 58.9 | 177.3 | 940.8 |
| Example 10 | 67.0 | 186.4 | 897.6 |
| Example 11 | 67.2 | 195.2 | 944.4 |
| Example 12 | 67,3 | 195.4 | 944.4 |
| Example 13 | 67.4 | 195.4 | 944.4 |
| Example 14 | 67.5 | 195.2 | 944.4 |
| Example 15 | 67.4 | 195.2 | 944.4 |
| Comparative Example 1 | 60.5 | 178.6 | 785.6 |
| Comparative Example 2 | 61.7 | 177.7 | 920.3 |
| Comparative Example 3 | 66.0 | 179.8 | 285.3 |

It can be found in Examples 1 to 15 and Comparative Examples 1 to 3 that: characteristics of output power of the positive electrode plate plane under a low SOC were closely related to the spacing between various active substance particles and the compacted density and the porosity of the positive electrode plate, as well as the types, respective particle morphologies and particle size distributions of the positive active substance I and the positive active substance II, and an overall particle size distribution condition after the positive active substance I and the positive active substance II were mixed. By properly setting the active substance particle size distributions and relative percent compositions of the layered lithium nickel transition metal oxide and the olivine-type li-containing phosphate of the positive active material, as well as the spacing between active substance particles in the positive electrode plate plane, and the compacted density and the porosity of the overall positive electrode plate, the lithium ion transmission rate and charge-discharge power of the positive electrode plate were optimized, thereby achieving the objective of increasing instantaneous discharge power of the battery under a low SOC.

Although this application has been illustrated and described with specific embodiments, it should be understood that many other variations and modifications can be made without departing from the spirit and scope of this application. Therefore, the appended claims are intended to be construed as to cover all these modifications and variations within the scope of this application.

What is claimed is:

1. A lithium-ion battery, comprising:
a positive electrode plate, wherein the positive electrode plate includes a positive current collector and a positive active material layer arranged on at least one surface of the positive current collector;
a positive active material in the positive active material layer comprises a positive active substance I and a positive active substance II, and a particle size distribution $(D_{max}-D_{min})_I$ of the positive active substance I is smaller than a particle size distribution $(D_{max}-D_{min})_{II}$ of the positive active substance II, wherein:
the positive active substance I is a layered lithium nickel transition metal oxide;
the positive active substance I has a single particle morphology with an average particle size of 3 μm to 6.2 μm;
the positive active substance II is an olivine-type lithium-containing phosphate;
the positive active substance II includes (i) micropowder particles with a size of less than 500 nm and (ii) secondary particles with a secondary particle size of 8 μm to 16 μm, both of which are separately present; and
the positive electrode plate satisfies $8 \leq N/(PD \times (1-P_1) \times (1-A)) \leq 19$, wherein:
A is a mass percentage of the positive active substance II in a total weight of the positive active material;
N is a number of particles of the positive active substance I accommodated in the positive active material layer in a thickness direction of the positive active material layer, and N is in a range of 6 to 55;
PD is a compacted density of the positive electrode plate, measured in g/cm³; and
$P_1$ is a porosity of the positive electrode plate, and
wherein the mass percentage A of the positive active substance II in the total weight of the positive active material satisfies 2%≤A≤20%.

2. The lithium-ion battery according to claim 1, wherein the number N of particles of the positive active substance I is 6 to 40.

3. The lithium-ion battery according to claim 1, wherein the mass percentage A of the positive active substance II in the total weight of the positive active material satisfies 10%≤A≤20%.

4. The lithium-ion battery according to claim 1, wherein the porosity $P_1$ of the positive electrode plate satisfies 20%<$P_1$≤25%.

5. The lithium-ion battery according to claim 1, wherein the compacted density PD of the positive electrode plate satisfies 3.2 g/cm³≤PD≤3.5 g/cm³.

6. The lithium-ion battery according to claim 1, wherein:
the layered lithium nickel transition metal oxide is selected from one or more of $Li_{x1}Ni_{(1-y1-z1-a1)}Co_{y1}Mn_{z1}M1_{a1}O_2$, $Li_{x2}Ni_{(1-y2-z2-a2)}Co_{y2}Al_{z2}M2_{a2}O_2$, and a composite material obtained by coating and modifying, wherein:
0.90≤x1≤1.05, 0≤y1≤0.2, 0≤z1≤0.2, 0≤a1≤0.05, and M1 is selected from one or more of Ti, Al, Zr, Mg, Zn, Ba, Mo, and B; and
0.90≤x2≤1.05, 0≤y2≤0.1, 0≤z2≤0.1, 0≤a2≤0.05, and M2 is selected from one or more of Ti, Mn, Zr, Mg, Zn, Ba, Mo, and B.

7. The lithium-ion battery according to claim 1, wherein:
a general formula of the olivine-type lithium-containing phosphate is $LiFe_{(1-x3-y3)}Mn_{x3}M'_{y3}PO_4$, wherein 0≤x3≤1, 0≤y3<0.1, and M' is selected from one or more of transition metal elements other than Fe and Mn, and non-transition metal elements.

8. The lithium-ion battery according to claim 1, wherein a negative active material in a negative electrode plate is selected from one or more of: soft carbon, hard carbon, artificial graphite, natural graphite, silicon, a silicon oxide compound, a silicon carbon composite, lithium titanate, and a metal that is able to form an alloy with lithium.

9. A positive electrode plate for a lithium-ion battery, comprising a positive current collector and a positive active material layer arranged on at least one surface of the positive current collector, wherein:
a positive active material in the positive active material layer comprises a positive active substance I and a positive active substance II, and a particle size distribution $(D_{max}-D_{min})_I$ of the positive active substance I is smaller than a particle size distribution $(D_{max}-D_{min})_{II}$ of the positive active substance II, wherein:
the positive active substance I is a layered lithium nickel transition metal oxide;
the positive active substance I has a single particle morphology with an average particle size of 3 μm to 6.2 μm;
the positive active substance II is an olivine-type lithium-containing phosphate;
the positive active substance II includes (i) micropowder particles with a size of less than 500 nm and (ii) secondary particles with a secondary particle size of 8 μm to 16 μm, both of which are separately present; and
the positive electrode plate satisfies 8≤N/(PD×(1−$P_1$)×(1−A))≤19, wherein:
A is a mass percentage of the positive active substance II in a total weight of the positive active material;
N is a number of particles of the positive active substance I accommodated in the positive active material layer in a thickness direction of the positive active material layer, and N is in a range of 6 to 55;
PD is a compacted density of the positive electrode plate, measured in g/cm³; and
$P_1$ is a porosity of the positive electrode plate, and
wherein the mass percentage A of the positive active substance II in the total weight of the positive active material satisfies 2%≤A≤20%.

10. The positive electrode plate according to claim 9, wherein the number N of particles of the positive active substance I is 6 to 40.

11. The positive electrode plate according to claim 9, wherein the mass percentage A of the positive active substance II in the total weight of the positive active material satisfies 10%≤A≤20%.

12. The positive electrode plate according to claim 9, wherein the porosity $P_1$ of the positive electrode plate satisfies 20%≤$P_1$≤25%.

13. The positive electrode plate according to claim 9, wherein the compacted density PD of the positive electrode plate satisfies 3.2 g/cm³≤PD≤3.5 g/cm³.

14. An apparatus, comprising a lithium-ion battery, wherein the lithium-ion battery is used as a power supply for the apparatus and the lithium-ion battery comprises a positive electrode plate, the positive electrode plate includes a positive current collector and a positive active material layer arranged on at least one surface of the positive current collector;
a positive active material in the positive active material layer comprises a positive active substance I and a positive active substance II, and a particle size distribution $(D_{max}-D_{min})_I$ of the positive active substance I is smaller than a particle size distribution $(D_{max}-D_{min})_{II}$ of the positive active substance II, wherein:
the positive active substance I is a layered lithium nickel transition metal oxide;
the positive active substance I has a single particle morphology with an average particle size of 3 μm to 6.2 μm;
the positive active substance II is an olivine-type lithium-containing phosphate;
the positive active substance II includes (i) micropowder particles with a size of less than 500 nm and (ii) secondary particles with a secondary particle size of 8 μm to 16 μm, both of which are separately present; and
the positive electrode plate satisfies 8≤N/(PD×(1−$P_1$)×(1−A))≤19, wherein:
A is a mass percentage of the positive active substance II in a total weight of the positive active material;
N is a number of particles of the positive active substance I accommodated in the positive active material layer in a thickness direction of the positive active material layer, and N is in a range of 6 to 55;
PD is a compacted density of the positive electrode plate, measured in g/cm³; and
$P_1$ is a porosity of the positive electrode plate, and
wherein the mass percentage A of the positive active substance II in the total weight of the positive active material satisfies 2%≤A≥20%.

15. The apparatus according to claim 14, wherein the mass percentage A of the positive active substance II in the total weight of the positive active material satisfies 10%≤A≤20%.

16. The apparatus according to claim 14, wherein the porosity $P_1$ of the positive electrode plate satisfies 20%≤$P_1$≤25%.

17. The apparatus according to claim 14, wherein the compacted density PD of the positive electrode plate satisfies 3.2 g/cm³≤PD≤3.5 g/cm³.

* * * * *